(12) United States Patent
Buerkle et al.

(10) Patent No.: US 9,090,279 B2
(45) Date of Patent: Jul. 28, 2015

(54) METHOD AND DEVICE FOR DETERMINING A TRANSVERSAL CONTROLLER PARAMETERIZATION FOR TRANSVERSAL CONTROL OF A VEHICLE

(75) Inventors: Lutz Buerkle, Stuttgart (DE); Thomas App, Bretten (DE); Thomas Glaser, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 48 days.

(21) Appl. No.: 13/881,846

(22) PCT Filed: Sep. 21, 2011

(86) PCT No.: PCT/EP2011/066429
§ 371 (c)(1),
(2), (4) Date: Oct. 28, 2013

(87) PCT Pub. No.: WO2012/055645
PCT Pub. Date: May 3, 2012

(65) Prior Publication Data
US 2014/0039716 A1     Feb. 6, 2014

(30) Foreign Application Priority Data

Oct. 26, 2010  (DE) .................. 10 2010 042 900

(51) Int. Cl.
*B62D 6/00*      (2006.01)
*B60W 50/00*    (2006.01)
*B62D 15/02*    (2006.01)
*B60W 30/10*    (2006.01)
*B60W 10/20*    (2006.01)
*B60W 30/18*    (2012.01)

(52) U.S. Cl.
CPC ............... *B62D 6/00* (2013.01); *B60W 30/10* (2013.01); *B60W 50/0098* (2013.01); *B62D 15/025* (2013.01); *B60W 10/20* (2013.01); *B60W 30/18145* (2013.01); *B60W 2050/0062* (2013.01); *B60W 2520/10* (2013.01); *B60W 2550/146* (2013.01); *B60W 2550/402* (2013.01)

(58) Field of Classification Search
USPC ............................................................. 701/1
See application file for complete search history.

(56) References Cited

U.S. PATENT DOCUMENTS 6,223,117 B1 *   4/2001  Labuhn et al. ................. 701/93
6,405,128 B1 *   6/2002  Bechtolsheim et al. ...... 701/431
6,735,515 B2 *   5/2004  Bechtolsheim et al. ...... 701/532

(Continued)

FOREIGN PATENT DOCUMENTS

DE  10 2005 004 747    8/2006
DE  10 2005 048 014    4/2007

(Continued)

OTHER PUBLICATIONS

International Search Report, International Application No. PCT/EP2011/066429, dated Dec. 20, 2011.

*Primary Examiner* — Thomas Tarcza
*Assistant Examiner* — Alex C Dunn
(74) *Attorney, Agent, or Firm* — Kenyon & Kenyon LLP

(57) ABSTRACT

A method for determining a transversal controller parameterization for transversal control of a vehicle on a route segment to be instantaneously traveled on by the vehicle, having a step for determining the parameter based on a piece of information about a curvature of the route segment to be instantaneously traveled on.

12 Claims, 2 Drawing Sheets

(56) References Cited

U.S. PATENT DOCUMENTS

| | | | |
|---|---|---|---|
| 7,072,764 B2* | 7/2006 | Donath et al. | 701/532 |
| 8,258,934 B2* | 9/2012 | Filev et al. | 340/435 |
| 8,315,756 B2* | 11/2012 | Caveney | 701/23 |
| 8,346,706 B2 | 1/2013 | Groitzsch et al. | |
| 8,370,023 B2 | 2/2013 | Maass | |
| 8,543,261 B2* | 9/2013 | Anderson et al. | 701/3 |
| 8,706,417 B2* | 4/2014 | Zeng et al. | 701/533 |
| 2007/0150157 A1* | 6/2007 | Lee et al. | 701/93 |
| 2008/0270018 A1* | 10/2008 | Citelli | 701/200 |
| 2010/0256836 A1* | 10/2010 | Mudalige | 701/2 |
| 2010/0256852 A1* | 10/2010 | Mudalige | 701/24 |
| 2011/0205045 A1* | 8/2011 | Pilutti et al. | 340/441 |
| 2012/0083947 A1* | 4/2012 | Anderson et al. | 701/3 |
| 2013/0274956 A1* | 10/2013 | Pilutti et al. | 701/1 |
| 2014/0207333 A1* | 7/2014 | Vandivier et al. | 701/36 |

FOREIGN PATENT DOCUMENTS

| | | |
|---|---|---|
| DE | 10 2008 023 972 | 11/2008 |
| JP | 5-270419 | 10/1993 |
| JP | 10-119807 | 5/1998 |
| JP | 2008-234593 | 10/2008 |
| JP | 2010-30444 | 2/2010 |

* cited by examiner

METHOD AND DEVICE FOR DETERMINING A TRANSVERSAL CONTROLLER PARAMETERIZATION FOR TRANSVERSAL CONTROL OF A VEHICLE

FIELD

The present invention relates to a method for determining a transversal controller parameterization for the transversal control of a vehicle, a method for ascertaining a manipulated variable for the transversal control of a vehicle, and a corresponding device as well as a corresponding computer program product.

BACKGROUND INFORMATION

Lane keeping assist systems such as LDW (Lane Departure Warning) and LKS (Lane Keeping Support), which warn the driver upon unintentionally departing the lane, or which help the driver keep the vehicle in the lane with the aid of a directed guiding torque on the steering wheel, have now been introduced into the European market.

German Patent Application No. DE 10 2008 023 972 A1 describes a method for identifying traffic-relevant information in a driving vehicle. Sensor data and map data of a navigation system are searched for traffic-relevant information contained therein and condensed to relevant sensor data and map data, after which a corresponding output signal is output. The traffic-relevant information may be, in particular, speed-limiting traffic signs, road markings or obstacles.

SUMMARY

In accordance with the present invention, an example method is provided for determining a transversal controller parameterization for transversal control of a vehicle, an example method is provided for ascertaining a manipulated variable for the transversal control of a vehicle, furthermore an example device is provided which uses these methods and finally an example corresponding computer program product is provided.

The approach according to the present invention may be advantageously used in connection with a lane keeping assist system. A system of this type generally uses a video-based lane detection system, with the aid of which the course of the lane ahead of the vehicle, for example a curvature or a change in curvature of the lane, and the relative position of the vehicle in the lane, for example a transversal distance or a difference angle, may be determined. In determining lane information or in preparing such information, however, additional surroundings sensors and information from a digital map may be used in conjunction with a GPS locating system, similar to a navigation system, for supporting and expanding the video-based lane information. For example, information about the course of the driven route segment, the road type, etc., are recorded on the digital map. This information may be called up for the vehicle location determined with the aid of a GPS locating module and the upcoming route segment.

LKS systems support the driver in guiding his or her vehicle in the lane. The data detected by the surroundings sensors is supplied to a transversal controller, which then requests from the electric power steering system the assisting steering torque needed for keeping the lane. Since the dynamics of a vehicle changes over the possible velocity range, e.g., 0 to 200 km/h, it is necessary in such systems to adapt the controller parameterization of the transversal controller to the velocity being driven by switching the controller parameters. This system state-dependent parameterization of the transversal controller is referred to in control technology as gain scheduling. If this parameter adaptation is not carried out, the result may be poor system performance. This may be expressed, for example, in the fact that the vehicle wobbles in the lane or even a system instability sets in, in which the wobbling movement increases until the vehicle departs the lane.

In accordance with the present invention, optimum transversal controller tuning with the aid of a selected parameter set for lane guidance depends not only on the vehicle velocity but also on the structural design of the driven road on which the vehicle travels. For optimum lane guidance, one needs a different controller parameterization on winding roads, e.g., country roads, than on primarily straight roads, e.g., highways, even while driving at the same velocity in both cases, e.g., at 100 km/h. A route section may thus be classified from straight to very winding, including any number of finer subdivisions, which is referred to below as the road class. With the aid of a road curvature-dependent or road class-dependent parameterization provided according to this approach, the different requirements of driving in a wobble-free straight trajectory as well as effective lane keeping when negotiating tight curves may be taken into account to the same extent.

An object of the approach presented herein is to expand the velocity gain scheduling to different road classes or different curvature states of roads, a road class gain scheduling, so to speak. The curvature of the road is provided in digital maps as an attribute and is therefore available. Depending on the driven road class or a classification of the road, e.g., as winding or straight, a controller parameterization then takes place as part of the road class gain scheduling. In the event that the digital map is unavailable, a road class may still be selected, for example based on the route already traveled. The preview made possible by the digital map would thus be omitted and the controller adapted after a delay.

Using the approach presented herein, a more situation-specific parameterization of the transversal controller may advantageously be achieved, which results overall in a better system performance of the lane keeping system and thus greater user acceptance.

The present invention provides an example method for determining a transversal controller parameterization for transversal control of a vehicle on a route segment to be instantaneously traveled on by the vehicle, the method including determining the transversal controller parameterization based on a piece of information about a curvature of the route segment to be instantaneously traveled on.

The method may be carried out, for example, in conjunction with a lane keeping assistance system of the vehicle. The transversal control system of the vehicle may be used, for example, to ensure wobble-free driving of the vehicle within provided lane boundaries of the route segment to be traveled on. With the aid of the transversal control, the vehicle may be kept, for example, on a driving trajectory. This means that an intervention by the transversal control system is carried out if a deviation of the vehicle from the driving trajectory is detected. The transversal controller parameterization may include one or a plurality of parameter(s). A control behavior of the transversal controller may be set with the aid of the transversal controller parameterization. According to the present invention, the control behavior may be set as a function of the curvature. For example, a parameter may determine the duration and intensity of a steering angle of the vehicle, which may be necessary for optimally following the lane at a given curvature of the route segment. The parameter may be part of a parameter set for transversal control of the vehicle. The route segment to be driven may be, for example, a predefined extension located ahead of the vehicle, e.g., a kilometer, a highway, a country road or a town road. The route segment may be, for example, part of a route to a driving destination ascertained by a navigation system of the vehicle. The information about the curvature may include, for example, a number and position of left-hand and/or right-hand curves or curvatures within the route segment to be traveled on. In addition, the information about the curvature may include details about the radii and/or the lengths of the curves or curvatures included in the route segment. It may be possible to calculate the curvature from the radius and the radius from the curvature. Accordingly, the information about the curvature may describe a winding mountain pass road or a nearly straight stretch, for example, of a highway segment whose curvature is imperceptible or difficult to perceive with the naked eye. In the ideal case, a curvature indication may be provided for each location. According to one specific embodiment, the transversal controller parameterization may be determined on the basis of a road type on which the vehicle is instantaneously located. In general, all information which is provided by a map or a corresponding data collection may be used to determine the transversal controller parameterization. For example, a piece of information about a lane width may be used to adapt the transversal controller parameterization. In comparison to a wider lane, a narrower lane requires a better control performance, i.e., deviations from a setpoint trajectory should not be too great.

The present invention furthermore provides an example method in which the following are carried out for determining the transversal controller parameterization:
providing a plurality of curviness ratings which represent different curvature states of a possible course of a road, each curviness rating including at least one parameter which is related to a curvature state corresponding to the curviness rating;
ascertaining a curvature of the instantaneous route segment to be driven;
selecting an instantaneous curviness rating from the plurality of curviness ratings based on the curvature; and
providing the at least one parameter of the instantaneous curviness rating as the transversal controller parameterization for the transversal control of the vehicle.

The example method may be carried out, for example, in conjunction with a lane keeping assist system of the vehicle. For example, the different curviness ratings may describe curvature states from "very winding" to "nearly straight." Accordingly, the individual parameters assigned to the different curviness ratings may define, e.g., control signals for steering actions of different durations and intensities. The parameters may thus define different transversal controller parameterizations which are optimal for the instantaneous road type. The curvature of the route segment to be instantaneously driven may be ascertained, for example, by accessing a digital map which includes the curvature state of the route segment. The selection of the instantaneous curviness rating may be carried out, e.g., with the aid of a suitable algorithm which selects the suitable curviness rating by comparing the curvature state of the instantaneous route segment with the different curvature states of the curviness ratings. The parameters included in the curviness ratings may be stored in a memory. A parameter of a curviness rating which is assigned to the instantaneous route segment may thus be read out from the memory. The parameter may be provided, for example, to a transversal controller connected to a navigation system of the vehicle or to a control unit which is designed to output a control signal for the transversal control system of the vehicle, e.g., to an electric power steering system of the vehicle.

According to one specific embodiment, each of the plurality of curviness ratings may include a plurality of parameters related to different driving velocities of the vehicle. The steering action to be carried out for keeping the lane on the route segment may thus be advantageously adapted to an instantaneous driving velocity of the vehicle. The transversal control may thus be carried out precisely according to the instantaneously prevailing conditions, since the precise course of a curve or curvature as well as the velocity at which the curve or curvature is being negotiated are available to the control unit as information for transversal control of the vehicle.

Accordingly, the example method may furthermore include a step for ascertaining an instantaneous driving velocity of the vehicle. In the step for determining the parameter, the transversal controller parameterization may furthermore be determined by taking into account the instantaneous driving velocity. For example, a curviness rating for the velocity ranges 0 to 50 km/h, 50 to 100 km/h and 150 to 200 km/h may each have a different parameter. The velocity ranges provided are selected only by way of example.

In the ascertaining step, the curvature may furthermore be determined by accessing a digital map stored in the vehicle. For this purpose, an instantaneous position of the vehicle may first be ascertained and marked on the map for the purpose of calculating, starting from this point, the curvature of a predefined section, located ahead of the vehicle, of a driving route ascertained by the navigation system of the vehicle. This advantageously is information which is always available during route guidance by the navigation system. In addition to a piece of information about the curvature, additional map information may be incorporated in the determination of the transversal controller parameterization.

Alternatively, the curvature may be ascertained in the ascertainment step on the basis of a road type being instantaneously traveled on, which is ascertained with the aid of a digital map of the vehicle. A road type may identify, for example, a highway, a country road or a town road for which a typical curvature may be assumed in each case, which, in turn, may be assigned to a corresponding curviness rating having one or multiple corresponding parameter(s) for the transversal control. This specific embodiment of the method offers the advantage that the method may be carried out much faster and with fewer repetitions.

Alternatively or additionally, the curvature may be ascertained in the ascertainment step on the basis of a curvature of a traveled route segment. For example, if the vehicle has been following a very winding road up to an instantaneous point in time or an instantaneous position, it may be assumed that this curvature state will generally continue for the time being, since the curvature of a road is usually determined by the topography and thus does not change abruptly. This specific embodiment is useful if it is not possible to ascertain a route with the aid of the navigation system, for example, due to lack of satellite coverage of a region or due to interference in the satellite reception. The method proposed herein may thus be carried out at least temporarily even independently of the navigation system of the vehicle.

The present invention furthermore provides an example method for ascertaining a manipulated variable for the transversal control of a vehicle, the method having the following steps:
determining a transversal controller parameterization for the transversal control of the vehicle on a route segment being instantaneously traveled on by the vehicle;

ascertaining a deviation of an instantaneous position of the vehicle from a setpoint position of the vehicle in a lane of the route section driven by the vehicle; and ascertaining a manipulated variable for the transversal control, based on the deviation and the transversal controller parameterization.

The example method may be carried out in a control unit which is connected to a navigation system of the vehicle or which is integrated into the navigation system of the vehicle. The instantaneous position of the vehicle in the lane may be advantageously supplied by a camera system, for example a video sensor system using a downstream lane detection algorithm. The deviation of the instantaneous position from the setpoint position of the vehicle may be ascertained by comparing the instantaneous position with the setpoint position, for example as part of a suitable control method. The deviation may be established when a threshold value for a deviation of an actual position from a setpoint position of the vehicle is exceeded. If guidance is carried out in the middle of the lane, no such threshold value exists, or the threshold value is zero. The lane may be delimited, for example by road posts, a guide rail or a curb on one side and by a lane marking of the route segment on the other side. The manipulated variable for the transversal control may be ascertained in the control unit by using a value for the ascertained deviation and the parameter and, for example, output to a transversal controller of the vehicle which is connected to a power steering system for the purpose of carrying out the transversal control of the vehicle.

According to one specific embodiment, the setpoint position may be located on a driving trajectory for the route segment to be instantaneously traveled on. The driving trajectory may run along the middle of the lane of the route segment to be driven by the vehicle. If, for example, it is meaningful to cut tight curves of the course of the road, the driving trajectory may also deviate at least partially from the middle of the lane. Using the driving trajectory as a basis for carrying out the method is advantageous since this makes it possible to drive the vehicle very smoothly and steadily.

According to another specific embodiment, the setpoint position may be related to a distance to a boundary of the lane. The boundary may be, for example, a curb and/or a lane marking. This specific embodiment of the method is aimed primarily at a particularly safe driving of the vehicle. This specific embodiment is thus advantageous, for example, for a narrow and confusing course of the road within a town.

The present invention furthermore provides an example device which is designed to carry out or implement the steps of the method according to the present invention. The device may be designed as a control unit which is connectable to a navigation system of the vehicle. The object of the present invention may also be achieved quickly and efficiently with the aid of this embodiment variant of the present invention in the form of a device.

In the present case, a device may be understood to be an electrical unit which processes sensor signals and outputs control signals or manipulated variables as a function thereof. The device may have an interface which may be implemented as hardware and/or software. In a hardware design, the interfaces may be, for example, part of a so-called system ASIC, which includes a wide range of functions of the device. However, it is also possible for the interfaces to be separate, integrated circuits or to be made up at least partially of discrete components. In a software design, the interfaces may be software modules which are provided, for example, on a microcontroller, along with other software modules.

A computer program product having program code is also advantageous, which may be stored on a machine-readable carrier such as a semiconductor memory, a hard disk memory or an optical memory, and is used to carry out the method according to one of the specific embodiments described above when the program is executed on a unit corresponding to a computer.

The present invention is explained in greater detail below by way of example on the basis of the attached figures.

DETAILED DESCRIPTION OF EXAMPLE EMBODIMENTS

Figure 1A:
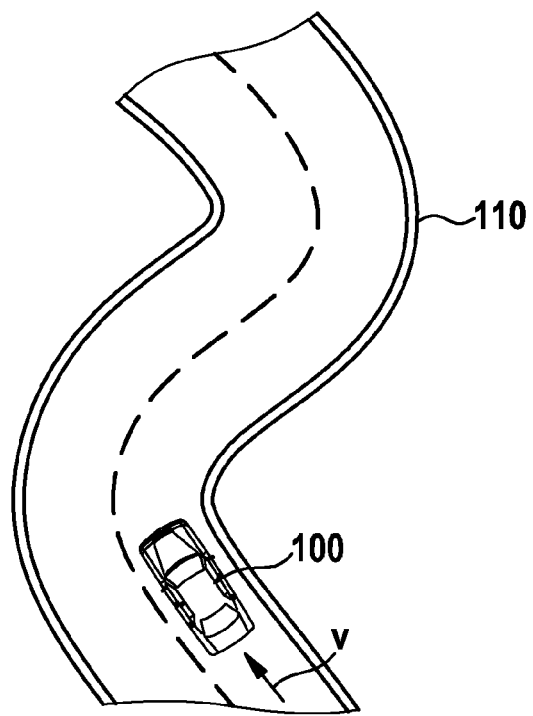
FIG. 1a shows a vehicle on a route segment which has a first curvature, according to one exemplary embodiment of the present invention.

In the following description of preferred exemplary embodiments of the present invention, identical or similar reference numerals are used for the elements which are illustrated in the different figures and have similar functions, and these elements will not be described repeatedly.

FIG. 1 shows a vehicle 100 on a route segment 110 which has a first curvature, according to one exemplary embodiment of the present invention. The representation in FIG. 1 may be displayed as is or in similar form, for example on a display device of a navigation unit of vehicle 100. Route segment 110 may be part of a route to a driving destination ascertained by the navigation system. The first curvature of route segment 110 has a right-hand curve which gives way to a subsequent left-hand curve. Route segment 110 may be assigned, e.g., to a curviness rating of "winding." Vehicle 100 moves toward the curves in the right-hand lane at a velocity v for the purpose of negotiating these curves. The lane is delimited by a structural or colored boundary on the right, e.g., a guide rail or a side marking, and by a lane marking on the left. A suitable passage through route segment 110 depends to the same extent on instantaneous driving velocity v of vehicle 100 and on the curvature state of route segment 110. According to the method provided herein, transversal control of vehicle 100, which permits safe and smooth passage through route segment 110 in the right lane, may be achieved by using a parameter or parameter set assigned to the first curvature and driving velocity v of the vehicle. The transversal control may be carried out by outputting a suitable manipulated variable to a steering system of vehicle 100 or by suitable intervention into the steering system. In response thereto, the steering system then performs steering actions of a suitable duration and intensity, so that route segment 110 is passed without direct intervention into the steering system of vehicle 100 on the part of the driver. Alternatively, a temporary, corrective automatic steering wheel motion may be carried out, e.g., if a distance to a lane boundary is too small, or a warning tone may be output in such a case which tells the driver to correct his steering.

Figure 1B:
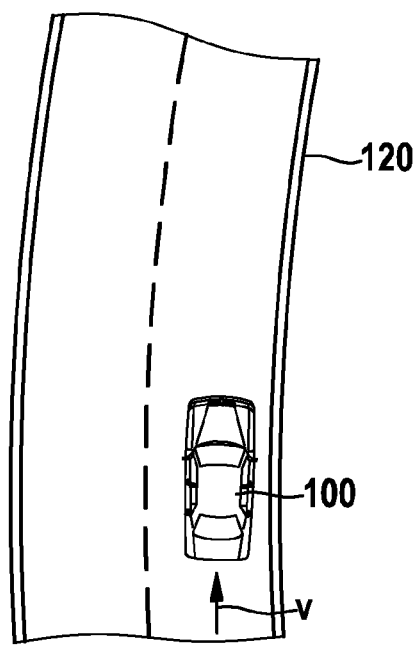
FIG. 1b shows a vehicle on a route segment having a second curvature, according to one exemplary embodiment of the present invention.

FIG. 1b shows vehicle 100 in an approach to a nearly straight route segment 120. Route segment 120 may be assigned, e.g., to a curviness rating of "straight," since it has only a slight right-hand curvature. In contrast to the representation in FIG. 1a, another parameter for the transversal control is incorporated into the method accordingly, so that transversal control which deviates from FIG. 1a causes vehicle 100 to keep the lane while passing through route segment 120 even at the same driving velocity v of vehicle 100 as in FIG. 1a.

Figure 2:
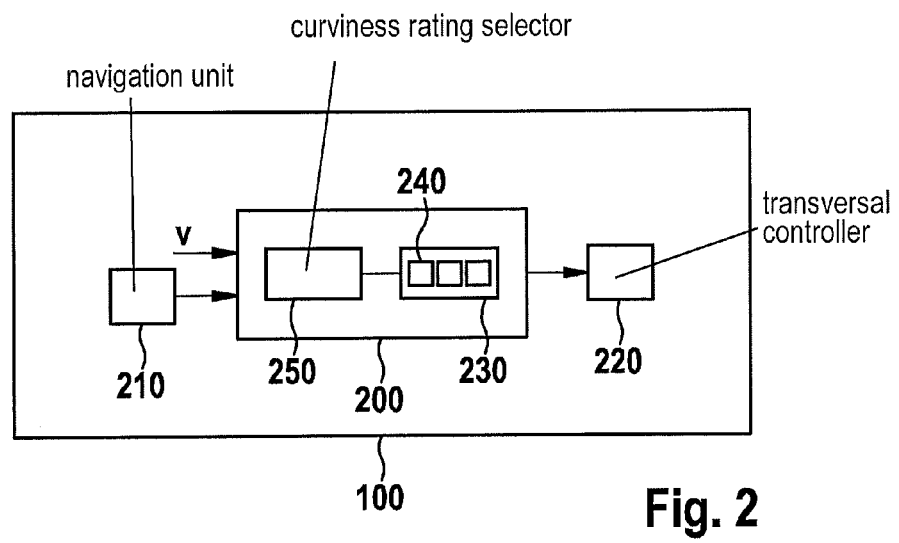
FIG. 2 shows a block diagram of a device for determining a parameter for transversal control of a vehicle, according to one exemplary embodiment of the present invention.

FIG. 2 shows a vehicle 100 having a device 200 for determining a parameter for transversal control of a vehicle according to one exemplary embodiment of the present invention. The transversal control system may be road class-adaptive transversal controller based on a digital map. Vehicle 100 has a navigation unit 210 as well as a transversal controller 220. Device 200 includes a memory device 230, in which a plurality of curviness ratings 240 is stored, and a device 250 for selecting a curviness rating 240 from a plurality of curviness ratings. Curviness ratings 240 represent different curvature states of a possible course of a road. Each curviness rating 240 includes a parameter or a parameter set including multiple parameters, which is related to a curvature state corresponding to curviness rating 240. Navigation unit 210 of vehicle 100 ascertains a curvature of a route segment to be instantaneously traveled on by accessing a digital map stored in vehicle 100, and it transmits a piece of information about the curvature to device 200 via a suitable interface. An instantaneous driving velocity v of vehicle 100 is transmitted to device 200 via another suitable interface. Device 250 selects an instantaneous curviness rating 240 from the plurality of curviness ratings on the basis of the information about the curvature. A parameter of instantaneous curviness rating 240, in turn, is determined as the parameter for the transversal control of vehicle 100 and provided to transversal controller 220 of vehicle 100 via a suitable interface on the basis of the information about instantaneous driving velocity v. If a deviation of an actual position from a setpoint position is established in relation to a transversal position of the vehicle within the lane, transversal controller 220, which is set by the instantaneous parameter, may initiate a correspondingly suitable steering intervention for the purpose of guiding the vehicle to the setpoint position.

Figure 3:
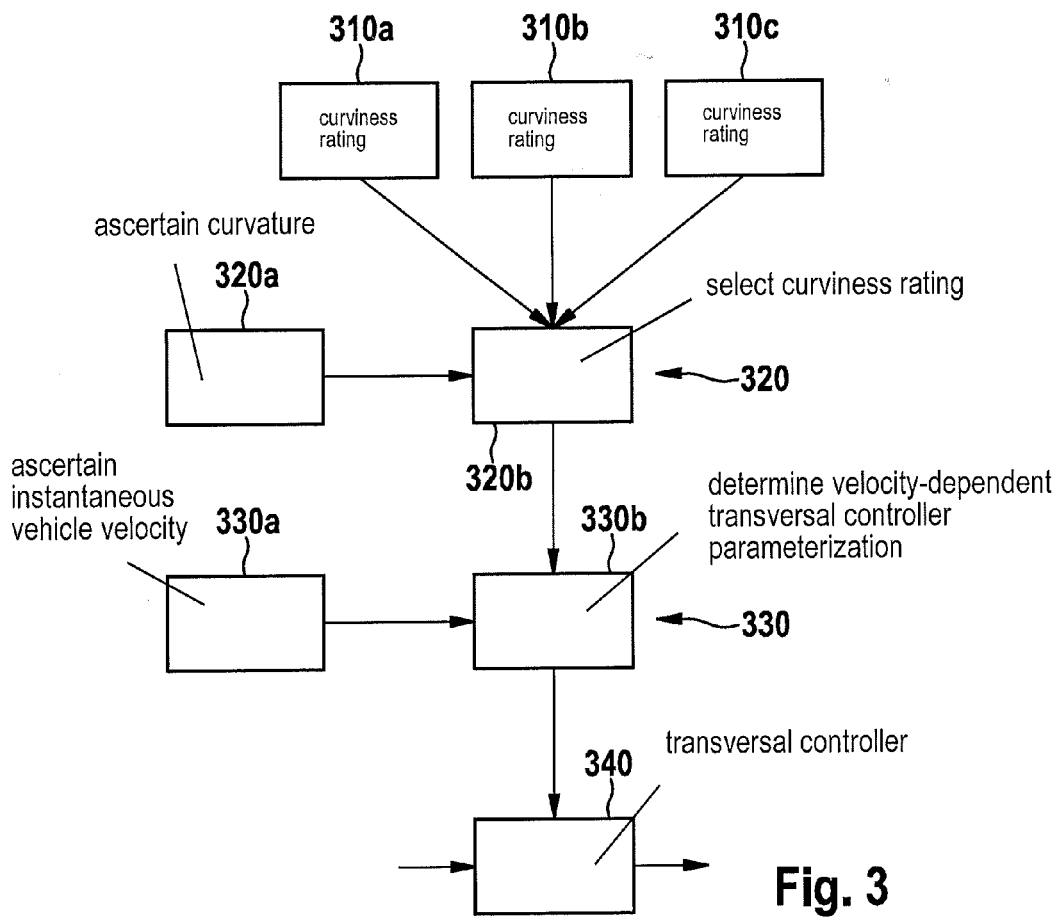
FIG. 3 shows a flow chart of a method for determining a parameter for transversal control of a vehicle, according to one exemplary embodiment of the present invention.

FIG. 3 shows a flow chart of a method for determining a parameter for transversal control of a vehicle, according to one exemplary embodiment of the present invention. Blocks 310a, 310b, 310c include a plurality of curviness ratings which represent different curvature states of a possible course of a road. According to the exemplary embodiment of the method illustrated in FIG. 3, a curviness rating having a transversal controller parameterization which is related to a typical curvature state of a highway is provided in a block 310a, a curviness rating having a transversal controller parameterization which is related to a typical curvature state of a country road is provided in a block 310b, and a curviness rating having a transversal controller parameterization which is related to a typical curvature state of a main street is provided in a block 310c.

The particular transversal controller parameterization of the above-mentioned curviness ratings includes a plurality of parameters related to different driving velocities of the vehicle. The corresponding parameters may be stored in a memory so that blocks 310a, 310b, 310c may be memory devices. The so-called road class gain scheduling is carried out in a function segment 320. A curvature of a route segment to be instantaneously traveled on is ascertained in a block 320a with the aid of GPS locating and access to a digital map. The curvature is used to classify the route segment so that the route segment may be assigned a road class. In a block 320b, a curviness rating corresponding to the ascertained road class is selected from a plurality of curviness ratings provided in blocks 310a, 310b, 310c on the basis of the road class ascertained in block 320a. In response thereto, one of blocks 310a, 310b, 310c may be accessed and a corresponding transversal controller parameterization read out. A road class-dependent transfer of the corresponding transversal controller parameterization table may be carried out by function segment 320. In other words, a suitable parameter or parameter set may be provided from blocks 310a, 310b, 310c as a function of the road class. A so-called velocity gain scheduling, in which an instantaneous vehicle velocity of the vehicle is ascertained in a block 330a or provided by a vehicle CAN bus, is carried out in a function segment 330. In a block 330b, a velocity-dependent transversal controller parameterization is determined on the basis of the vehicle velocity by selecting a corresponding velocity-dependent parameter from the selected curviness rating and determining it as the parameter for the transversal control of the vehicle, based on the instantaneous vehicle velocity. A velocity-dependent transfer of the corresponding transversal controller parameterization may thus take place with the aid of function segment 330. In other words, a suitable parameter or parameter set may be provided from blocks 310a, 310b, 310c as a function of the velocity. An instantaneous parameter or parameter set which is assigned to the instantaneous road class and the instantaneous vehicle velocity may thus be selected from blocks 310a, 310b, 310c with the aid of function segments 320, 330. The instantaneous parameter or parameter set is transferred to a transversal controller 340. Transversal controller 340 is designed to carry out a transversal control algorithm in response to an input signal and to output a corresponding manipulated variable for the transversal control of the vehicle. The transversal control algorithm is set to the instantaneous road class and instantaneous vehicle velocity with the aid of the instantaneous parameter or parameter set.

Corresponding method steps of the method may be implemented in function blocks 320a, 320b, 330a, 330b for determining a parameter for transversal control of a vehicle. Function segments 320, 330 may also be carried out in reverse order or together in a shared function segment. Unless the transversal controller parameterizations in blocks 310a, 310b, 310c already have velocity-dependent parameters, a corresponding adaptation of the parameters, for example in function block 330b, may be carried out.

In summary, a controller designed according to the approach provided herein is characterized, among other things, by the fact that, in contrast to the pure, velocity-adaptive controller parameterization, i.e., the velocity gain scheduling, it may have not only one parameterization table which includes the velocity-dependent parameters but also multiple such tables, each table being assigned, e.g., to a certain road class. The corresponding table may be selected as a function of the returned road class of the digital map and used for parameterizing the controller.

The exemplary embodiments described and illustrated in the figures are selected only by way of example. Different exemplary embodiments may be combined with each other in their entirety or with regard to individual features. In addition, one exemplary embodiment may be supplemented by features of another exemplary embodiment. Furthermore, method steps according to the present invention may be repeated as well as carried out in a different order than the one described.

What is claimed is:

1. A method for determining a transversal controller parameterization for transversal control of a vehicle on a route segment to be instantaneously traveled on by the vehicle, the method comprising:
- determining, with a controller, the transversal controller parameterization based on a piece of information about a curvature of the route segment to be instantaneously traveled on, by performing the following:
  - providing, with the controller, a plurality of curviness ratings which represent different curvature states of a possible course of a road, each curviness rating including a parameter which is related to a curvature state corresponding to the curviness rating;
  - ascertaining, with the controller, a curvature of the route segment to be instantaneously traveled on;
  - selecting, with the controller, an instantaneous curviness rating from the plurality of curviness ratings based on the curvature;
  - providing, with the controller, the parameter of the instantaneous curviness rating as the transversal controller parameterization for the transversal control of the vehicle; and
  - ascertaining an instantaneous driving velocity of the vehicle, the transversal controller parameterization furthermore being determined based on the instantaneous driving velocity;
  - wherein the plurality of curviness ratings includes a plurality of parameters related to different velocities of the vehicle, and
  - wherein a curvature characteristic includes information about radii and/or lengths of the curves included in the route segment instantaneously to be traveled, and wherein at least three curviness categories are provided, which represent different curviness states relating to the curviness of a possible road characteristic.

2. The method as recited in claim 1, wherein the plurality of curviness ratings includes a plurality of parameters related to different velocities of the vehicle.

3. The method as recited in claim 1, wherein the curvature is determined by accessing a digital map stored in the vehicle.

4. The method as recited in claim 1, wherein the curvature is ascertained based on a curvature of a traveled route segment.

5. A method for ascertaining a manipulated variable for transversal control of a vehicle, comprising:
- determining, with a controller, a transversal controller parameterization for the transversal control of the vehicle on a route segment to be instantaneously traveled on by the vehicle based on a piece of information about a curvature of the road segment, by performing the following:
  - providing, with the controller, a plurality of curviness ratings which represent different curvature states of a possible course of a road, each curviness rating including a parameter which is related to a curvature state corresponding to the curviness rating;
  - ascertaining, with the controller, a curvature of the route segment to be instantaneously traveled on;
  - selecting, with the controller, an instantaneous curviness rating from the plurality of curviness ratings based on the curvature; and
  - providing, with the controller, the parameter of the instantaneous curviness rating as the transversal controller parameterization for the transversal control of the vehicle;
- ascertaining, with the controller, a deviation of an instantaneous position of the vehicle from a setpoint position of the vehicle in a lane of the route segment traveled on by the vehicle;
- ascertaining, with the controller, a manipulated variable for the transversal control based on the deviation and the transversal controller parameterization; and
- ascertaining an instantaneous driving velocity of the vehicle, the transversal controller parameterization furthermore being determined based on the instantaneous driving velocity;
- wherein the plurality of curviness ratings includes a plurality of parameters related to different velocities of the vehicle, and
- wherein a curvature characteristic includes information about radii and/or lengths of the curves included in the route segment instantaneously to be traveled, and wherein at least three curviness categories are provided, which represent different curviness states relating to the curviness of a possible road characteristic.

6. The method as recited in claim 5, wherein the setpoint position is located on a driving trajectory for the route segment to be instantaneously traveled on.

7. A device to determine a transversal controller parameterization for transversal control of a vehicle on a route segment to be instantaneously traveled on by the vehicle, comprising:
- a controller having a processor to determine the transversal controller parameterization based on a piece of information about a curvature of the route segment to be instantaneously traveled on, by performing the following:
  - providing, with the processor, a plurality of curviness ratings which represent different curvature states of a possible course of a road, each curviness rating including a parameter which is related to a curvature state corresponding to the curviness rating;
  - ascertaining, with the processor, a curvature of the route segment to be instantaneously traveled on;
  - selecting, with the processor, an instantaneous curviness rating from the plurality of curviness ratings based on the curvature;
  - providing, with the processor, the parameter of the instantaneous curviness rating as the transversal controller parameterization for the transversal control of the vehicle; and
  - ascertaining an instantaneous driving velocity of the vehicle, the transversal controller parameterization furthermore being determined based on the instantaneous driving velocity;
  - wherein the plurality of curviness ratings includes a plurality of parameters related to different velocities of the vehicle, and
  - wherein a curvature characteristic includes information about radii and/or lengths of the curves included in the route segment instantaneously to be traveled, and wherein at least three curviness categories are provided, which represent different curviness states relating to the curviness of a possible road characteristic.

8. A non-transitory computer-readable storage medium having a computer program, which is executable by a processor, comprising:
- a program code arrangement having program code for determining a transversal controller parameterization for transversal control of a vehicle on a route segment to be instantaneously traveled on by the vehicle, by performing the following:

determining the transversal controller parameterization based on a piece of information about a curvature of the route segment to be instantaneously traveled on, by performing the following:
- providing, with the controller, a plurality of curviness ratings which represent different curvature states of a possible course of a road, each curviness rating including a parameter which is related to a curvature state corresponding to the curviness rating;
- ascertaining, with the controller, a curvature of the route segment to be instantaneously traveled on;
- selecting, with the controller, an instantaneous curviness rating from the plurality of curviness ratings based on the curvature;
- providing, with the controller, the parameter of the instantaneous curviness rating as the transversal controller parameterization for the transversal control of the vehicle; and
- ascertaining an instantaneous driving velocity of the vehicle, the transversal controller parameterization furthermore being determined based on the instantaneous driving velocity;
- wherein the plurality of curviness ratings includes a plurality of parameters related to different velocities of the vehicle, and
- wherein a curvature characteristic includes information about radii and/or lengths of the curves included in the route segment instantaneously to be traveled, and wherein at least three curviness categories are provided, which represent different curviness states relating to the curviness of a possible road characteristic.

9. The computer-readable storage medium as recited in claim 8, wherein a curvature characteristic includes information about radii and/or lengths of the curves included in the route segment instantaneously to be traveled.

10. The method as recited in claim 1, wherein a curvature characteristic includes information about radii and/or lengths of the curves included in the route segment instantaneously to be traveled.

11. The method as recited in claim 5, wherein a curvature characteristic includes information about radii and/or lengths of the curves included in the route segment instantaneously to be traveled.

12. The device as recited in claim 7, wherein a curvature characteristic includes information about radii and/or lengths of the curves included in the route segment instantaneously to be traveled.

* * * * *